(12) United States Patent
Wu et al.

(10) Patent No.: US 10,824,221 B2
(45) Date of Patent: *Nov. 3, 2020

(54) METHOD AND SYSTEM FOR STORING PROGRAM GUIDE DATA IN A USER DEVICE

(71) Applicant: The DIRECTV Group, Inc., El Segundo, CA (US)

(72) Inventors: Leo Wu, Irvine, CA (US); Huy Q. Tran, Westminster, CA (US); Flemming R. Hansen, Los Angeles, CA (US); Peter Leong, Mountain View, CA (US); Eric H. Chang, Torrance, CA (US); Gordon H. Chen, Manhattan Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 16/029,782

(22) Filed: Jul. 9, 2018

(65) Prior Publication Data

US 2018/0314320 A1 Nov. 1, 2018

Related U.S. Application Data

(63) Continuation of application No. 12/895,645, filed on Sep. 30, 2010, now Pat. No. 10,048,745.

(51) Int. Cl.
*G06F 3/00* (2006.01)
*H04N 21/466* (2011.01)
(Continued)

(52) U.S. Cl.
CPC ............ *G06F 3/00* (2013.01); *H04N 21/4332* (2013.01); *H04N 21/4622* (2013.01);
(Continued)

(58) Field of Classification Search
CPC .. G06F 3/00; H04N 21/4332; H04N 21/4622; H04N 21/482; H04N 21/6112; H04N 21/6143
See application file for complete search history.

(56) References Cited

U.S. PATENT DOCUMENTS 6,312,336 B1 * 11/2001 Handelman ............. A63F 13/12
463/40
6,782,550 B1 * 8/2004 Cao ..................... H04N 5/44543
348/E5.105
(Continued)

OTHER PUBLICATIONS

"System for Combining Electronic Program Guide Data", WO1999035849 A1; PCT/US1999/000093; Publication Date: Jul. 15, 1999; Filing Date Jan. 5, 1999; Priority Date: Jan. 5, 1998; Inventors: Theodore D. Wugofski; Applicant: Amiga Dev LLC.

*Primary Examiner* — Mark D Featherstone
*Assistant Examiner* — Naveneet Gmahl
(74) *Attorney, Agent, or Firm* — Guntin & Gust, PLC; Ralph Trementozzi

(57) ABSTRACT

A system and method for operating system includes a first user device, a second user device, and a first device having a controller and a first database storing a first data object of a first type of data associated therewith and a second database storing a second data object of a second type of data associated therewith different than the first type of data. The second database is accessible separately from and simultaneously with the first database. The second data object forms a second portion of a display. The controller has an application interface selecting a selected database from the first, second database or both and separately and simultaneously accessing the first and second database based on the first user input command and the second user input command to obtain stored data and separately and simulta- (Continued)

neously communicating stored data to the first user device and to the second user device.

20 Claims, 7 Drawing Sheets

(51) Int. Cl.
    *H04N 21/462*      (2011.01)
    *H04N 21/482*      (2011.01)
    *H04N 21/433*      (2011.01)
    *H04N 21/61*      (2011.01)

(52) U.S. Cl.
    CPC ....... *H04N 21/482* (2013.01); *H04N 21/6112* (2013.01); *H04N 21/6143* (2013.01)

(56) References Cited

U.S. PATENT DOCUMENTS

| | | | |
|---|---|---|---|
| 7,508,454 B1* | 3/2009 | Vantalon | H04N 21/42623 348/385.1 |
| 7,739,711 B2 | 6/2010 | Finseth et al. | |
| 8,719,090 B2* | 5/2014 | Lewis | G06Q 30/0225 705/14.49 |
| 2002/0129366 A1* | 9/2002 | Schein | H04N 5/44543 725/43 |
| 2003/0005445 A1* | 1/2003 | Schein | H04N 5/44543 725/51 |
| 2003/0040962 A1* | 2/2003 | Lewis | G06Q 30/0225 725/32 |
| 2003/0172145 A1* | 9/2003 | Nguyen | G06Q 10/10 709/223 |
| 2003/0229900 A1* | 12/2003 | Reisman | G06F 16/954 725/87 |
| 2004/0187150 A1* | 9/2004 | Gonder | H04N 21/235 725/43 |
| 2004/0194136 A1* | 9/2004 | Finseth | H04N 5/44543 725/39 |
| 2004/0261114 A1* | 12/2004 | Addington | H04L 41/5051 725/106 |
| 2005/0203887 A1* | 9/2005 | Joshi | G06Q 10/00 |
| 2006/0161951 A1* | 7/2006 | Hindle | H04N 21/235 725/46 |
| 2006/0265362 A1 | 11/2006 | Bradford | |
| 2007/0107010 A1* | 5/2007 | Jolna | G06Q 30/02 725/34 |
| 2007/0157248 A1* | 7/2007 | Ellis | H04N 5/445 725/47 |
| 2007/0261070 A1 | 11/2007 | Brown et al. | |
| 2009/0052870 A1* | 2/2009 | Marsh | H04N 7/17318 386/292 |
| 2009/0220216 A1* | 9/2009 | Marsh | H04L 12/6418 386/292 |
| 2009/0260038 A1* | 10/2009 | Acton | H04N 5/44543 725/49 |
| 2010/0218231 A1* | 8/2010 | Frink | H04N 7/17318 725/118 |
| 2010/0299404 A1* | 11/2010 | Gonder | H04N 21/235 709/217 |
| 2011/0041153 A1* | 2/2011 | Simon | G06Q 30/02 725/46 |
| 2011/0289419 A1* | 11/2011 | Yu | G06F 9/44526 715/738 |
| 2015/0052570 A1* | 2/2015 | Lee | H04N 21/4622 725/110 |

\* cited by examiner

METHOD AND SYSTEM FOR STORING PROGRAM GUIDE DATA IN A USER DEVICE

CROSS-REFERENCE TO RELATED APPLICATIONS

This application is a continuation of U.S. patent application Ser. No. 12/895,645, filed on Sep. 30, 2010. The entire disclosure of the above application is incorporated herein by reference.

TECHNICAL FIELD

The present disclosure relates to a content processing and delivery system and, more specifically, to a method and system for searching content available in a content delivery system and displaying the results therefrom.

BACKGROUND

The statements in this section merely provide background information related to the present disclosure and may not constitute prior art.

Satellite television is increasing in popularity due to the ever-increasing amount of programming as well as the quality of programming. Programming includes standard national (CONUS) broadcasts, local or regional station broadcasts, on-demand content and interactive content.

While providing a large amount of content to consumers is desirable, it is also desirable to allow the consumers to easily find programming to view. Currently, a program guide provides a graphical representation of the content to a user. A program guide is typically a list of programs, times, and channels for the various content. Only a limited number of guide material may be provided on the screen at one time. Thus, the program guide, while useful, becomes a slow way of finding desirable content in a large amount of available content.

The processing resources within a set top box are also somewhat limited. As the amount of data grows contention issues for the database also grow. Further, time to access the data grows as the amount of data grows.

SUMMARY

The present disclosure provides a system and method for separating basic program guide data from other more-detailed data.

In one aspect of the disclosure, a method includes receiving a first data object at a user device, receiving a second data object at the user device, storing first object in a first memory within the user device, storing the second object in a second memory separated from the first memory of the user device, generating a user input command, selecting a memory location from the first memory or the second memory, obtaining stored data from the first memory or the second memory based on the user input commands and displaying stored data in response to obtaining.

In another aspect of the disclosure, a system and method for operating a user device includes a receiver that receives a first data object and a second data object. A first memory stores the first data object and a second memory stores the second data object. The second memory is separate from the first memory. A user interface module generates a user input command. An application interface selects a memory location from the first memory or the second memory and obtaining stored data from the first memory or the second memory based on the user input commands. A display displays the stored data.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
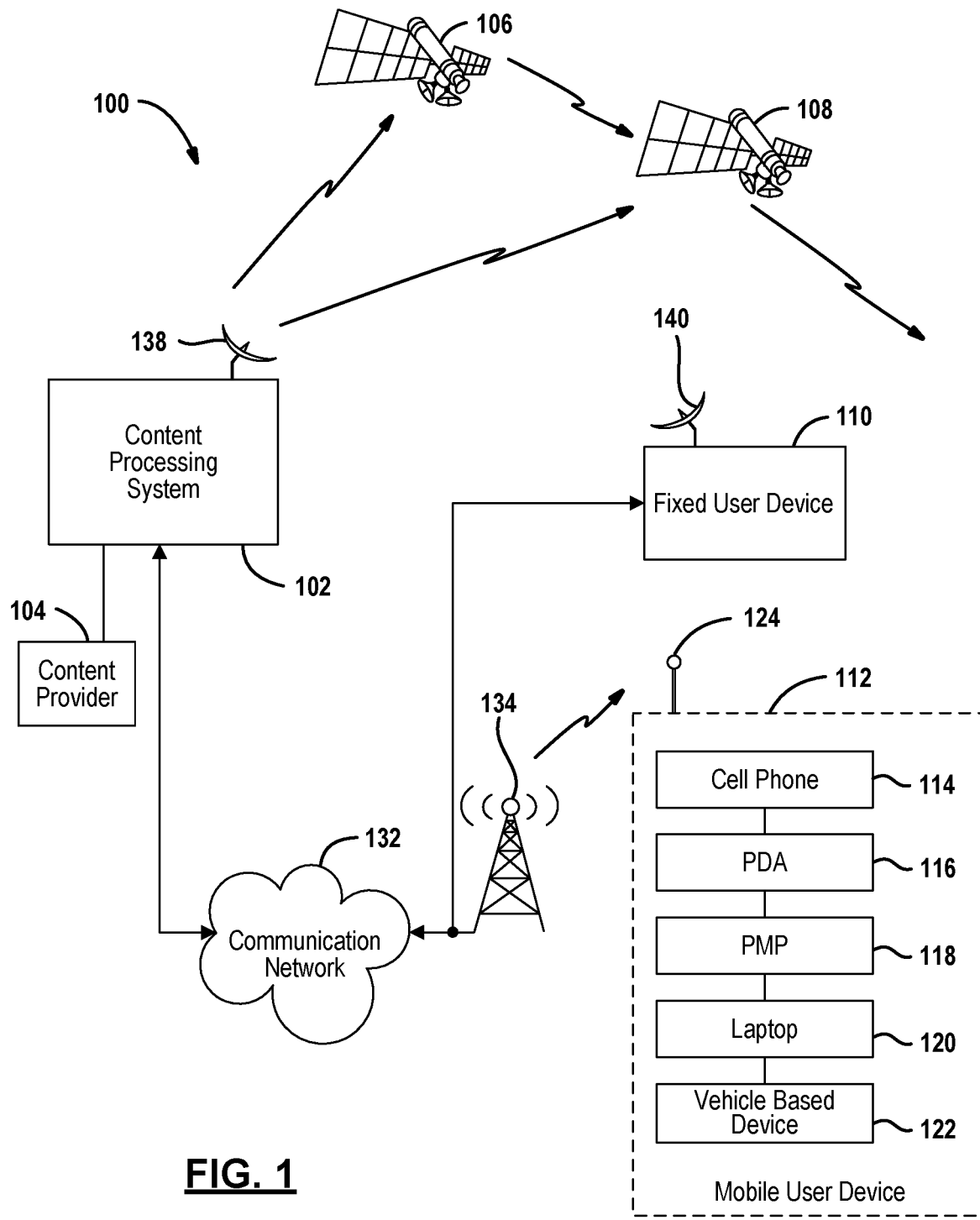
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is set forth with respect to a satellite broadcast television system. In particular, the following disclosure is made with respect to DIRECTV® broadcast services and systems. It should be understood that many other delivery systems are readily applicable to the disclosed systems and methods. Such systems include other wireless distribution systems, wired or cable distribution systems, cable television distribution systems, ultra high frequency (UHF)/very high frequency (VHF) radio frequency systems or other terrestrial broadcast systems (e.g., multi-channel multi-point distribution system (MMDS), local multi-point distribution system (LMDS), etc.), Internet-based distribution systems, cellular distribution systems, power-line broadcast systems, any point-to-point and/or multicast Internet protocol (IP) delivery network, and fiber optic networks. Further, the different functions collectively allocated among a head end (HE), integrated receiver/decoders (IRDs) and a content delivery network (CDN) as described below may be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

The following description refers to communicating content, data, control signals, data objects and the like. The content data, control signals, and data objects are communicated electronically using electrical or optical control signals.

Referring now to FIG. 1, a content communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs). Wireless communications are exchanged between the content processing system 102 and the fixed user devices 110 through one or more of the satellites 106, 108. The wireless communications may take place at any suitable frequency, such as, but not limited to, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Data or content provided to content processing system 102 from the media source 104 may be transmitted, for example, via an uplink antenna 138 to the satellites 106,108, one or more of which may be a geosynchronous or geostationary satellite, that, in turn, rebroadcast the information over broad geographical areas on the earth that include the user devices 110, 112. The satellites may have inter-satellite links as well. Among other things, the example content processing system 102 of FIG. 1 provides program material to the user devices 110, 112 and coordinates with the user devices 110, 112 to offer subscribers pay-per-view (PPV) program services, and broadband services, including on-demand programming, billing and associated decryption of video programs. Non-PPV (e.g. free or subscription) programming may also be received. A carousel of multiple program materials may be scheduled within the content processing system 102 whereby the satellites 106, 108 may be used to communicate metadata and content to the user devices 110, 112. The repetition rate and blocks of content and metadata may vary. To receive the information rebroadcast by satellites 106, 108, each for user device 110 is communicatively coupled to a receiver or downlink antenna 140.

As will be described below various types of content data may be communicated. Also, program guide data may also be communicated to the user devices. The program guide data may be used to form the structure of a grid guide (lines, row names, column times, etc.). The program guide data may also be used for providing extended data such as but not limited to graphics (posters, thumbnails), biographical information, content descriptions and parental guidance data.

Security of assets broadcast via the satellites 106, 108 may be established by applying encryption and decryption to assets or content during content processing and/or during broadcast (i.e., broadcast encryption). For example, an asset may be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the user device 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
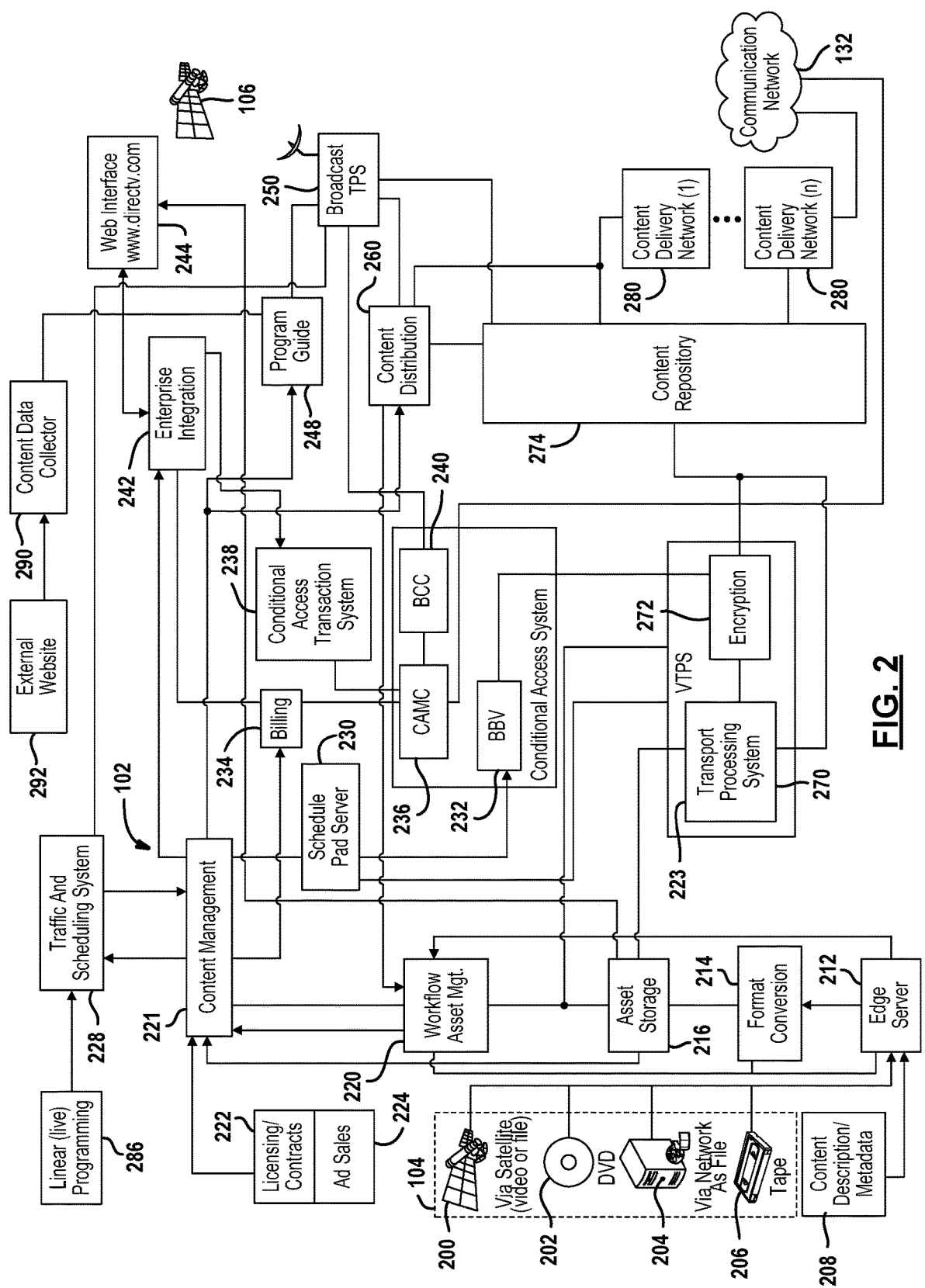
FIG. 2 is a detailed block diagrammatic view of the content processing system of FIG. 1.

Referring now to FIG. 2, the content processing system 102 of FIG. 1 is illustrated in further detail. The content provider 104 may include various types of content providers, including those that provide content by way of a satellite 200, digital versatile disc (DVD) 202, via a network as a file in 204, by way of tapes and other means. The content provider 104 may also provide graphics, content description, and other metadata 208 to the system.

The content providers 104 may be various types of content providers and provide various types of content including advertising content such as row advertising (ads). The content providers may provide various types of information including advertising information. Advertising providers may provide information on various products or various available or future content. It should be noted that the advertising provider and the content provider may be one in the same.

Content providers may also have a home page within the present system. Briefly, the home page is a portion of the program guide for selecting content to be downloaded to the user device. The system operator may also have its own home page that has various categories of content. The categories and types of home pages will be described below. The home page provides a listing of on-demand content for the particular subscriber.

The home page may be formed in various configurations including a menu structure. The content providers may also provide various metadata for the menu structure or program guide.

Another area of the content processing system 102 is an input server 212 that receives the various content and converts the format in a format conversion system 214. A house format asset storage server 216 may be used to store the content asset in a house format. Still image files, trailers, and other information may also be stored in the house format asset storage server. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The VTPS 223 may encode the packet. The encoder may encode the data according to the CableLabs® Video-on-Demand (VoD) encoding specification MD-SP-VOD-CEP-I01-040107 (i.e., performs asset encoding). The encoded data is then packetized into a stream of data packets by a packetizer 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102. The content management 221 may also assign material identifications to the various received content. The material identification may utilize the asset identifier (ID) in the metadata as well as the provider ID. Content, posters and other received information may be assigned related material identifications to make them easier to associate and retrieve. For example, different suffixes may be used to identify related content with the remainder of the material identification being the same.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

A traffic and scheduling system 228 is used to provide the requested channel, program associated data (PAD), channel information and program information packets (PIPs). The traffic and scheduling system 228 may schedule content processing for a plurality of received assets based on a desired program lineup to be offered by the communication system 100. This may include both on-demand programming and linear programming 286. For example, a live TV program for which a high demand for reruns might be expected could be assigned a high priority for content processing. The linear programming 786 provides live broadcasts through the satellite.

A schedule PAD server (SPS) 230 may be coupled to the workflow system and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives callback information from the communication network 132. The conditional access system may be used to generate authorizations, pay-per-view billing data, and callback data from the billing system 234. Record requests may also be provided from the conditional access transaction system 238. A conditional access system broadcast control center (BCC) 240 may be used to generate a conditional access packet from the information from the conditional access system 236.

The billing system 234 may generate purchase data that is provided to the enterprise integration (EI) block 242. The enterprise integration block 242 may generate record requests to the conditional access transaction system 238. Record requests may be generated through a web interface such as DIRECTV.com® in block 244. Various ordering information, such as ordering broadband (on-demand) video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Titles, description, various categories and metadata from the content management system 221 may be provided to the advanced program guide system 248. The program guide system 248 may be coupled to a satellite broadcasting system such as a broadcast transport processing system 250 that broadcasts linear, on-demand content and guide data to the users through the satellite 106, 108. The program guide system may form data objects from the data and metadata received from the various data sources.

The program guide data generated by the program guide system 248 may include data signals and data objects that are communicated to a user device and is used to generate a display of guide information to the user, wherein the program guide may be a grid guide and informs the user of particular programs that are broadcast on particular channels at particular times. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs.

Titles, descriptions and categories may also be provided from the content management system 221 to the content distribution system 260. Content files and metadata may be controlled by the content distribution system 260. Various types of data objects may be used to communicate the program guide content to the user devices. For example, a program object may be used to communicate data that may include, but is not limited to, category, title, rating, description, name, credit, related shows, pay-per-view price, studio, and the like. A channel object may communicate to infrequency, category rating, network, channel name and number. A schedule object may schedule a 24-hour block bridge between the channel and the program. A video-on-demand object may also be provided and provide the list of content and data to be displayed in the video-on-demand categories. These categories and the contents of the categories will be further described below.

Other types of objects may also be provided within the system. Objects such as extended objects having extended data beyond the normal program guide data may be categorized differently than program guide objects. The program guide objects may provide the basic data and may include program objects, channel objects and schedule objects as described above. The extended objects may include a graphics object that may contain HTML text, audio, or image objects. Graphics objects may contain any data that may be transferred via an HTTP protocol. The graphics objects may include various fields such as an object type field, an object aversion field, an object identifier that uniquely identifies the object, a priority field which provides objects storage priority, and an object cache type. The cache type may allow the user device to determine how and where to store the graphics object. In addition, a support-level field may also be provided within the graphics object data. If the value in the support level field exceeds the support level that corresponds to the content type, then the object may be dropped. A content type field may also be provided that is used to identify the type of the object. Examples of various types may include JPEG, ping format, HTML, a color look-up table, an image and I-frame format, and a binary driver. Other types of fields such as data lengths, descriptors, and the like may also be provided within the graphics object data.

An extended program object may also be provided. The extended program object may contain extended information about a single program defined by a content identifier. That is, upon selection of the user through a user interface, a content identifier may be used to look up an extended program object. The extended program object describes an extended set of information about a complete program without specifying any starting time or duration. The extended program object defines a program for a single content identifier. That is, there may be no variants of an extended program object for differing broadcast parameters or category flags. There may, for example, be a one-to-many relationship between the extended program object and program objects. That is, for a given program there may be various TV ratings, closed-captioning, HD and CRID identifiers that may all refer back to the same extended program object. The extended program object may include various types of information in various fields including an object type, an object version, a first referenced time, an EPO content identifier, a title length, a title, a connector type such as a sequel, prequel, series, remake, topic, series, spinoff, or the like. Various different award data may also be provided. The awards data may include an awards count, an awards source, an award level, award type, award year, or the like. A biography object identifier may also be provided that refers to a biography object for one of the persons listed within a credit for the extended program object. Various other credits including the names of persons, the role name, running time indicator, and the like may also be provided. Various ratings, rating counts, rating body identifiers, star ratings, the origin, the premier date, the season number, descriptor loops, and category and content advisory descriptors may also be provided.

Another type of extended program data is a biographical information object. The biographical information object contains information about a single individual contributor to a movie or television production. The biological information object may describe, but is not limited to, an individual, his contribution, biographical information, filmography and links to pictures. The biographical information object may also include an object type, an object version, a first reference data, an object identifier, and various other types of data such as birth, death, biography, gender, celebrity type, an awards indicator, a title length, a credit index, an award type, and the like.

Another type of extended program data may include a parental guidance object that contains parental guidance information a movie or television production. The parental guidance object may include information about a movie or television production through a number of mechanisms, including descriptions of the content, age-based ratings, numeric and text reviews, comments on subject in different types of areas such as sexual content, violence, social behavior, etc., and other recommended choices. The parental guidance object may include an object type, an object version, an object identifier, a reviewer, a title, title length, a release data indicator, a running time indicator, an age recommendation, a star rating, a published date, an unpublished date, an alert subject such as sexual content, violence, language, social behavior, commercialism, drugs, tobacco, alcohol, alert levels and other types of codes, such as star ratings and motion picture association explanations.

The video transport processing system 223 may includes a transport packaging system 270. The transport packaging system 270 creates pre-packetized unencrypted files that are stored in the content repository 274. An encryption module 272 receives the output of the transport packaging system and encrypts the packets. Fully packaged and encrypted files may also be stored in the content repository 274. Encryption may take place in the data portion of a packet and not the header portion.

One or more content delivery networks 280a-n may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

The content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocol (IP), file transfer protocol (FTP), hypertext transfer protocol (HTTP), etc. Each file received by the user device may be checked for completeness and integrity and if a file is not intact, missing, and/or damaged portions of the files may be delivered or downloaded again. Alternatively, the entire file may be purged from the IRD and delivered or downloaded again.

Security of assets available by way of the content delivery network may also be established. Control word packets for each broadcast-encrypted asset or content file may be provided to the content delivery network. Encryption may also be provided.

The broadcast transport processing system 250 may provide various functions, including encoding, packetizing, encrypting, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, program guide information or assets asset files, menus structures etc.) and/or live (linear) content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though the at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

A content data collector 290 may also be associated with the content processing system 102. The content data collector 290 may be a separate resource or be included within the content processing system 102. The content data collector 290 may be used to collect various types of data about content from an external website or websites 292. The external website 292 is an external source of data that is provided to the content data collector 290. The content data collector 290 may search for content on an external website 292 about various content titles, actors within the content titles, descriptions, filmography and content related to the content titles. In the present example, the external websites may be entertainment websites, sports websites, or various other types of websites. By way of example, the content data collector 290 may search for various terms such as content titles, actors, or other data. The external websites 292 may also provide information as to predicted ratings for various programming. One example of a website for data is Tribune Media Services (TMS) ON® service. The content data collector 290 may be in communication with the program guide module 248 which communicates the program guide content as well as other data to the various user devices.

Figure 3:
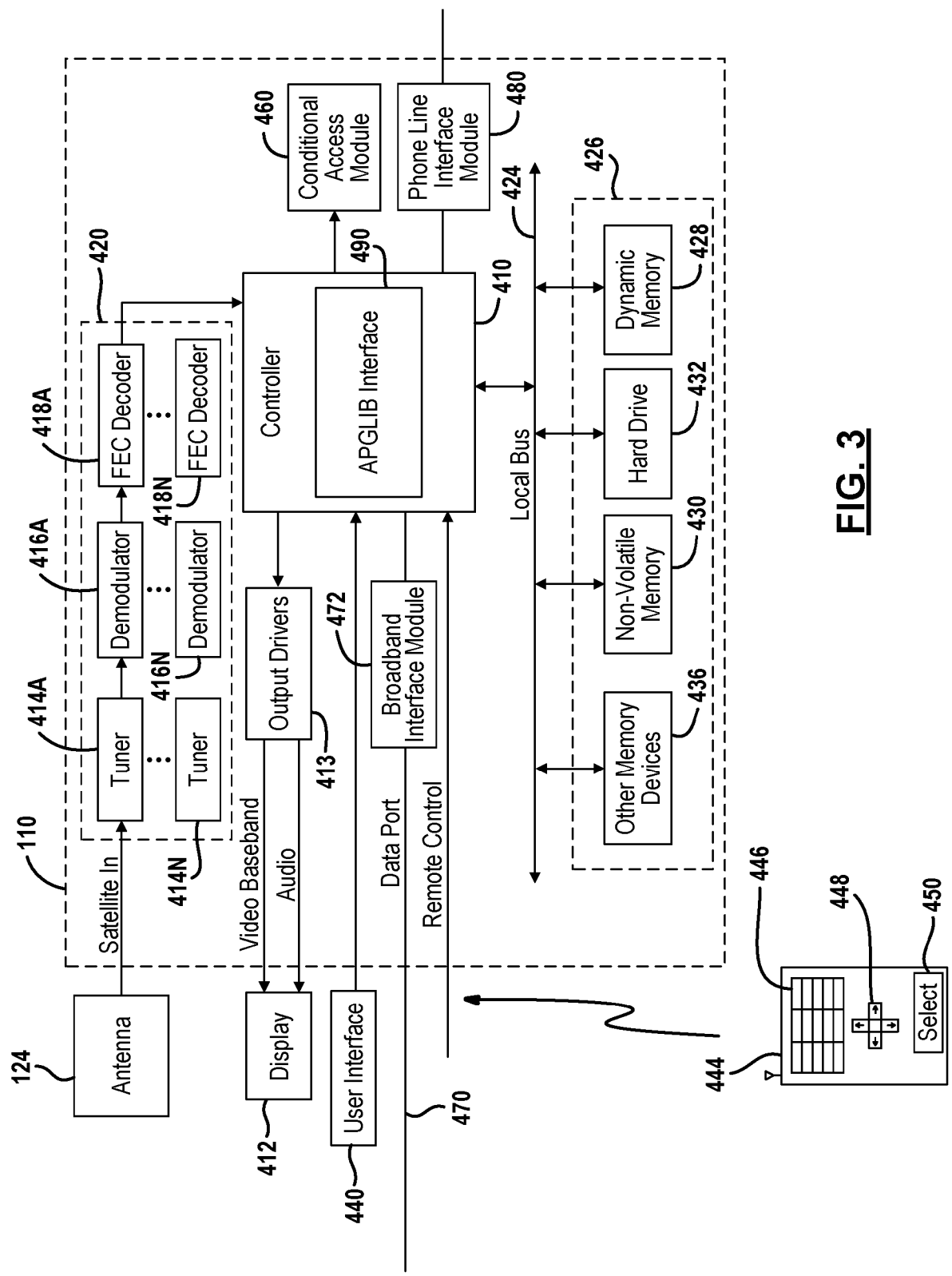
FIG. 3 is a detailed block diagrammatic view of the user device of FIG. 1.

Referring now to FIG. 3, a user device 110 such as a fixed user device is illustrated. A similar configuration for a mobile user device may also be used. The fixed user device may include a fixed antenna. If the user device is a mobile user device, the antenna 124 may be a rotating antenna that is used to track the relative movement of the satellite or an omni-directional antenna that may receive antenna signals from various directions.

The user device 110 may include a controller 410. The controller 410 may control various operations as will be described below. The user device 110 may be in communication with a display 412 through output drivers 413. The output drivers 413 may generate desired audio and video output formats suitable for the particular display 412.

The controller 410 may be a general processor such as a microprocessor. The controller 410 may be used to coordinate the control and the functions of the user device. These functions may include the functions of a receiving circuit 420. The receiving circuit 420 may include a tuner 414, a demodulator 416, a forward error correction decoder 418 and any buffers or other functions. More than one tuner, demodulator and FEC decoder may be provided as indicated by the reference numerals "A" and "N." One constructed embodiment may include four tuners, demodulators and decoders, although various numbers of tuners, demodulators and decoders may be provided depending upon the system requirements. The tuner 414 receives the signal or data from the broadcast channel. The signal may include programming content or different types of data including program guide data. The demodulator 416 demodulates the signal to form a demodulated signal or demodulated data. The decoder 418 decodes the demodulated signal to form a decoded data or decoded signal.

The controller 410 may also be coupled to a local bus 424. The local bus 424 may be used to couple a memory 426, including a dynamic memory 428, such as random access memory (RAM) which changes often and whose contents may be lost upon the interruption of power or boot up. The bus 424 may also be coupled to a non-volatile memory 430. One example of a non-volatile memory is an electrically erasable programmable read only memory (EEPROM). One specific type of EEPROM is flash memory. Flash memory is suitable since it is sectored into blocks of data that may be individually erased and rewritten.

A hard drive 432 may also be in communication with the local bus 424. The hard drive 432 may act as a digital video recorder for storing video and storing various data and various content. The various data stored may include metadata such as titles, actors, directors, descriptions, posters, identifiers, availability start times, availability end times, pricing data, timing data, program guide data, internal data regarding tuning, search recording and watching recorded content and various other types of data. The hard drive may also be interchangeable with another memory device with a large capacity.

Other memory devices 436 may also be coupled to the local bus 426. The other memory devices may include other types of dynamic memory, non-volatile memory, or may include removable memory devices. The display 412 may be changed under the controller 410 in response to data in the dynamic memory 428 or non-volatile memory 430.

Among other data, the memory 426 may be used to store data objects. The data objects may be separated by type and stored in different databases of memories as will be described below. The databases may be in various memories 428-436. Even in the same memory type, the databases would separate.

The controller 410 may also be coupled to a user interface 440. The user interface 440 may be various types of user interfaces such as a keyboard, push buttons, a touch screen, a voice activated interface, or the like. The user interface 440 may be used to select a channel, select various information, change the volume, change the display appearance, or other functions. In general, the user interface generates command signals that are communicated to the controller 410. The user interface 440 may be used in addition to a remote control device 444. The remote control device 444 may include a keypad 446, an arrow keypad 448, and a select button 450. Inputs to the user device may be provided by the remote control device or through the user interface 440.

A conditional access module card 460 (CAM) may also be incorporated into the user device. Access cards, such as a conditional access module, may be found in DIRECTV® units. The access card 460 may provide conditional access to various channels and wireless signals generated by the system. The access card 460 may control the decryption of program content. Not having an access card or not having an up-to-date access card 460 may prevent the user from receiving or displaying various video and other content from the system.

The controller 410 may also be in communication with a data port 470. The data port 470 may be a broadband data port that is coupled to the controller 410 through a broadband interface module 472. The broadband interface module 472 may allow wireless or wired communication between external devices with the controller 410. The controller 410 through the broadband interface module 472 may communicate with the internet and various systems such as the head end of the content communication system. Callback signals may be provided through the broadband interface module 472 from the controller 410.

The controller 410 may also be in communication with a phone link interface module 480. The phone link interface module 480 may couple the user device 110 to a public switched telephone network (PSTN). The user device 110 may generate callback signals to the head end through the phone interface module 480.

Callback signals are provided through the broadband interface module 472 and the phone interface module 480.

The controller 410 may include an APGLIB interface that acts as an application programming interface (API) for interfacing with the various data objects. The APGLIB interface 490 will be referred to as application interface or interface 490 from hereon. The interface 490 is used to obtain the data objects that are stored within the memory 426. The interface may also be used to store received data objects in the proper database. When the user device 110 receives data objects they are stored within the memory 426 as will be further described below. The user device 110 may receive the objects by way of satellite through the antenna 124. The data objects may also be communicated through the broadband interface module 472 that is used to communicate with a terrestrial broadband network. The data objects may also be received through the phone line interface module 480 over a phone line in a modem-type fashion. The program guide objects and the extended guide objects may be received through different networks. For example, the program guide objects may be received through the antenna 124 while the extended guide objects may be received through the broadband interface module 472. Further, the extended guide objects may also be pre-installed within the memory 426 prior to the user device 110 being delivered to the user.

Figure 4:
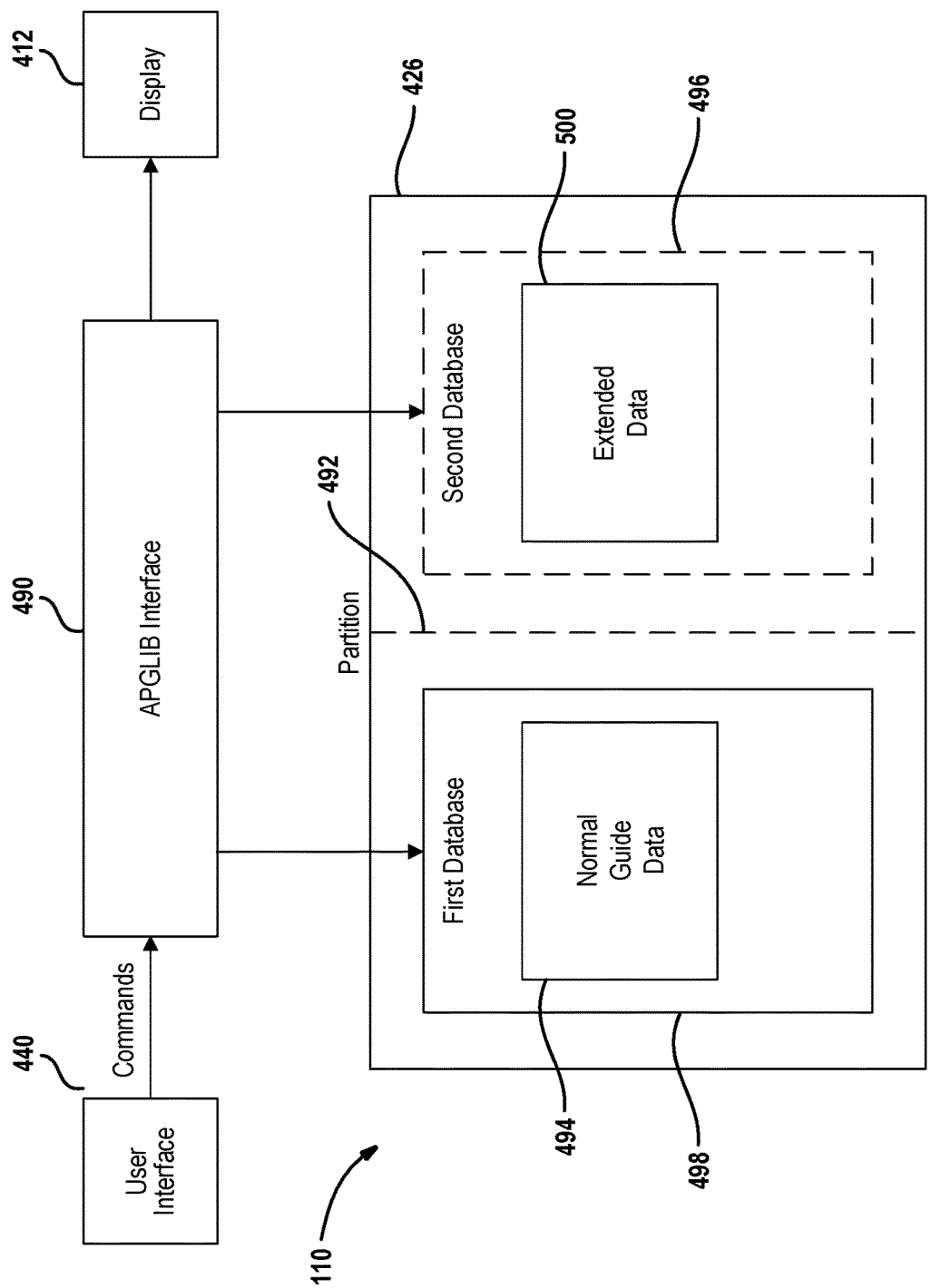
FIG. 4 is a simplified block diagrammatic view of the interface of the user device relative to the partitioned databases.

Referring now to FIG. 4, a simplified block diagrammatic view of the user device 110 is illustrated. As mentioned above, the user device may include the user interface 440. The user interface 440 may be used for scrolling through or generating commands relative to the screen display. The user interface 440 may include arrows and selection keys that indicate that the user would like different information displayed upon the screen display 412. The commands may be generated for moving about the program guide or for digging deeper for more extensive program data and descriptions. Posters, pictures and other different types of data may be provided. The memory 426 is generally illustrated as a single box. The memory, however, could be one of the various types of memories 428-436 illustrated in FIG. 3. The memory 428 is illustrated as having a partition 492 that includes a first database 494 in the first portion of the memory and a second database 496 in a second portion of the memory. The first database 494 may be used to store normal guide data 498. The second database 496 may be used to store extended data 500. When calling for different types of data, the interface 490 may generate calls to one or the other database 498, 500. By providing two different databases, 494, 496 for different types of data, various advantages may be achieved. For example, the databases may be used by more than one user device. The various "clients" may access the data simultaneously. Contention issues are reduced by reducing the number of potential conflicts from using a single-storage medium. Typically, when a database is accessed, other users are not allowed to access the database during that time. Various clients on a system may be trying to access the same data. Therefore, by separating the data access issues are reduced. It should be noted that the extended data 500 within the database 496 may be further partitioned based on object. That is, various objects may have various partitions therebetween to further segregate the data. Linking mechanisms may be used to link the various data objects within the memory.

Figure 5:
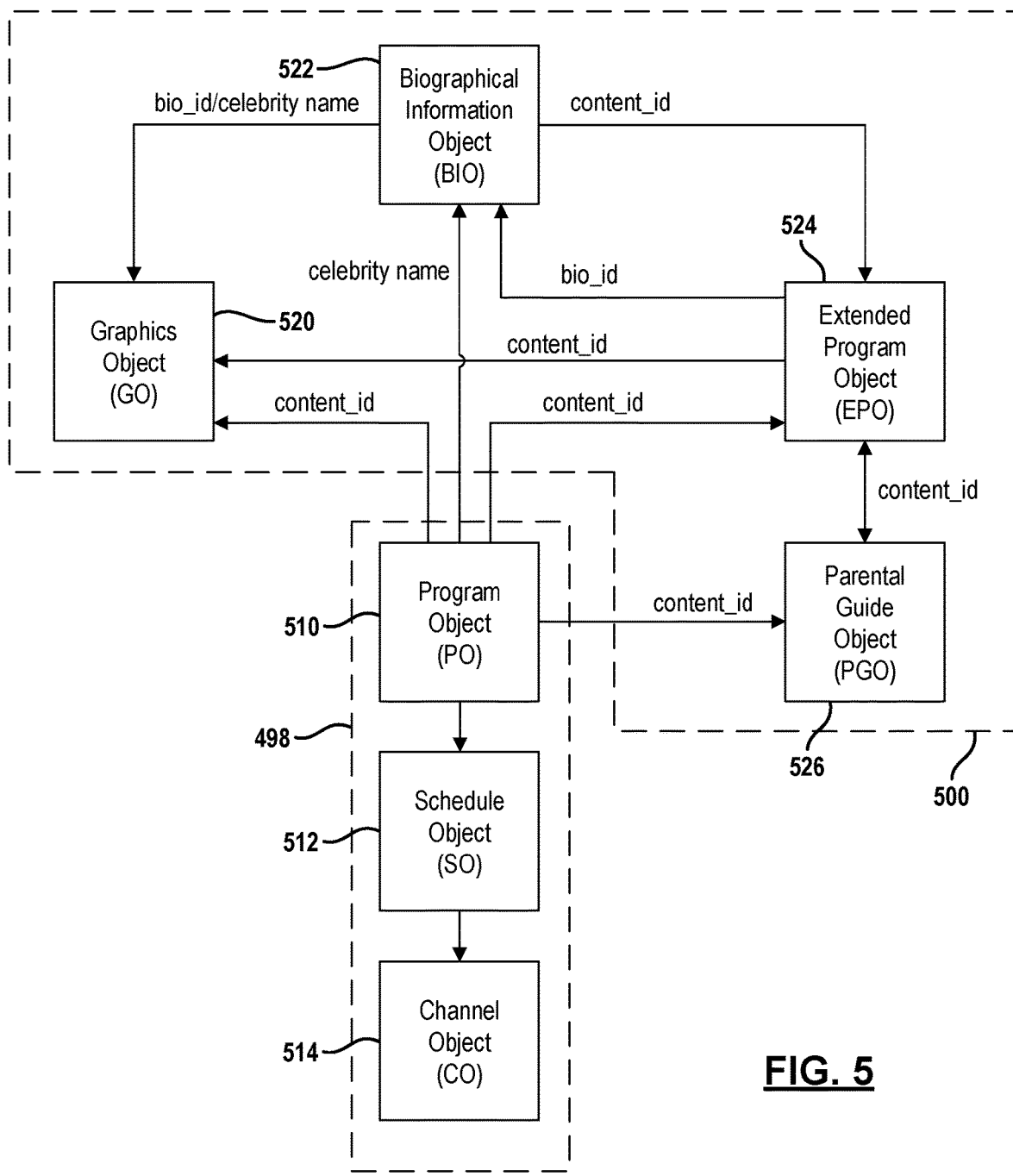
FIG. 5 is a plot of the link relationships between the extended program objects and the regular program objects.

Referring now to FIG. 5, the extended data 500 is shown grouped together and the normal guide data 498 is also shown grouped together. The normal guide data may include the program object 510 which is linked to the schedule object 512 which in turn is linked to the channel object 514. The user may be provided the grid guide based upon the channel object 514 which calls the schedule object 512 which in turn calls the program object 510. For each of the different objects, different data may be retrieved as was described above.

The program object 510 may also be linked to various portions of the extended objects 500. The extended objects 500 may include a graphics object 520, a biographical information object 522, an extended program object 524 and a parental guide object 526.

The program object 510 may be linked to the graphics object 520 using a content identifier (content id) for the program. A celebrity name may be used to link the program object 510 to the biographical information object 522. The content identifier may also be used to link the program object 510 to the extended program object 524. Likewise, the content identifier may also be used to link the program object 510 to the parental guidance object 526. The content identifier may also be used to link the parental guide object 526 and the extended program guide object 524. Likewise, the extended program guide object 524 may also be linked to the graphics object 520 using the content identifier. A biographical identifier may be used to form a link between the extended program object 524 and the biographical information object 522. The biographical identifier may be obtained from the extended program object. In the reverse manner, the content identifier may be used to link the biographical information object 522 and the extended program object 524. Various types of identifiers may be used to link the biographical information object 522 and the graphics object 520 such as the biographical identifier or the celebrity name. By selecting a person identifier, such as an actor identifier, a picture or graphics may be obtained. The content identifier may also be used to generate graphics object data. It should be noted that the extended program object 500 would remain relatively static compared to the normal guide data. The normal guide data is constantly changing. The information about various shows, movies, actors and other data within the extended data remains relatively fixed. Minor updates to actors' status and appearances in various movies, as well as new movies, would be periodically added. However, these are new additions and incremental rather than full replacements as may be done with the program guide. Should the program guide structure be completely changed, the extended data 500 would not require updating because of the separation in the database.

The interface 490 illustrated in FIGS. 3 and 4 determines the correct object and hence the correct database 496 based upon the user commands 440.

Figure 6:
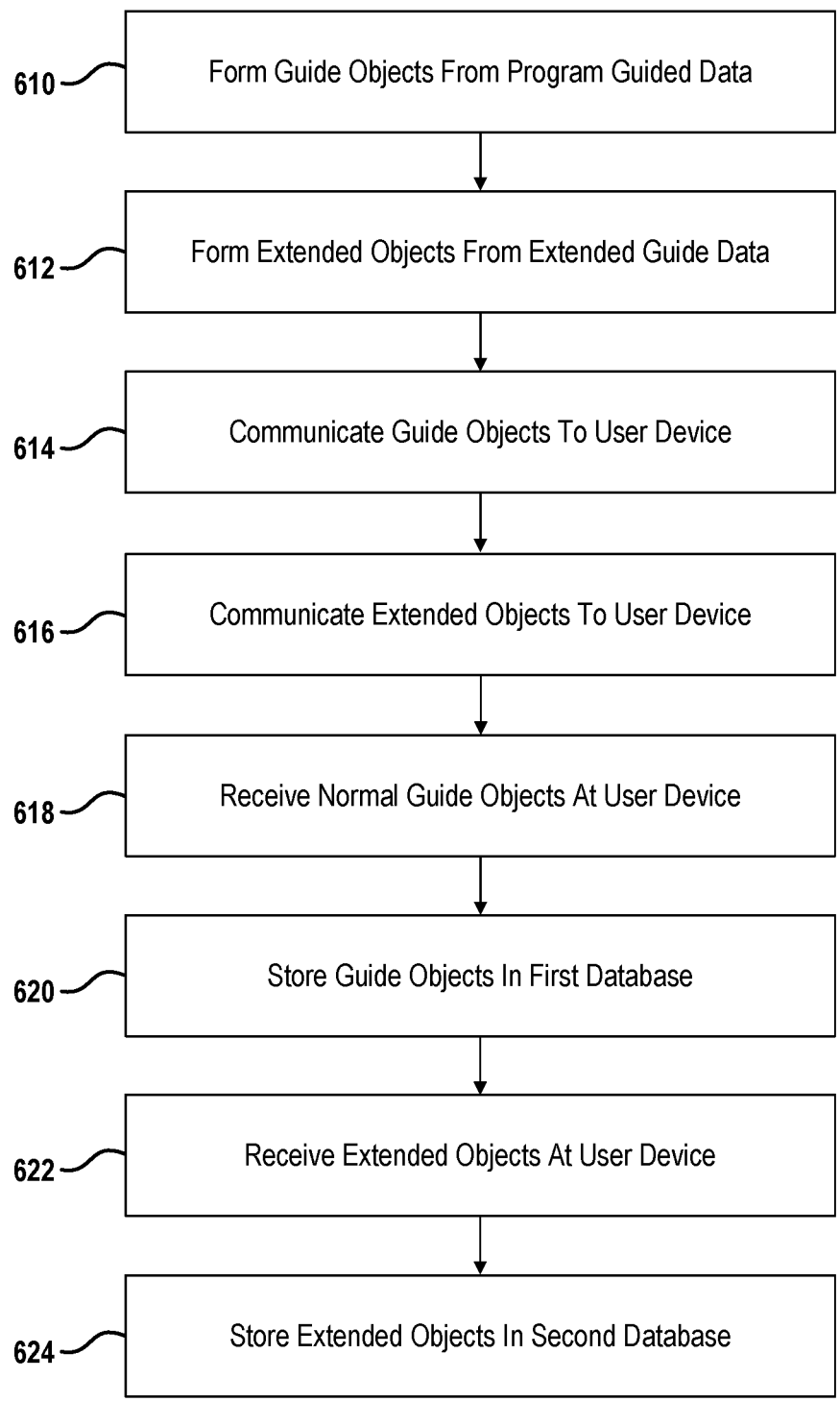
FIG. 6 is a flowchart of a method for obtaining and storing data objects.

Referring now to FIG. 6, a method for operating the communication system is set forth. In step 610, the guide objects are formed from program guide data. The guide objects may be referred to as normal guide objects that are used for the grid guide, including the channels, the network identifiers, colors and the lines associated with the grid guide. In step 612, the extended objects are formed from the extended guide data. The extended guide data may be retrieved from various locations, including the content processing system or external sources. The extended guide data may be supplied from various content suppliers as well. Various extended objects may be formed. Examples of extended objects were provided above and include, but are not limited to, graphics objects, biographical information objects, extended program guide objects, and parental guide objects.

In step 614, the guide objects are communicated to the user device. The guide objects may be communicated to the user device using a satellite. A carousel on the satellite may be used to communicate the guide objects in a repetitive fashion. The repetition rate for the carousel may be relatively fast so that the program guide has at least some basic information. For example, the normal guide objects may be completely loaded at a user device in less than 12 hours.

In step 616, the extended objects are communicated to the user device. The extended objects may be communicated to the user device in various ways, including using the satellite. When a satellite is used, a slower carousel than the guide object carousel may be used. The extended guide objects may be communicated to the user device after the normal guide objects. That is, the user device may be configured to first receive normal guide objects then, after all of the normal guide objects have been received, receive the extended objects. The extended objects may be on a slower carousel than the guide objects. The user device may be programmed to receive the extended objects a predetermined number of hours after the guide objects are started. For example, the extended objects may be received after a number of hours, such as 12 hours.

In step 618, the normal guide objects are received at the user device. As mentioned above, the normal guide objects may include the program objects, the schedule objects, and the channel objects.

In step 620, the guide objects are stored in a first database. The interface 490 described above in FIGS. 3 and 4 may control the storage of the objects. By viewing the object type, the object may be stored in the proper database.

In step 622, the extended objects are received at the user device. As mentioned above, the extended objects may be received in various ways including a different way than the normal guide objects. The extended objects may be received through the satellite or through another network such as a terrestrial broadband network. The terrestrial broadband network may use various types of optics or phone lines to deliver data.

In step 624, the extended objects are stored in a second database.

Figure 7:
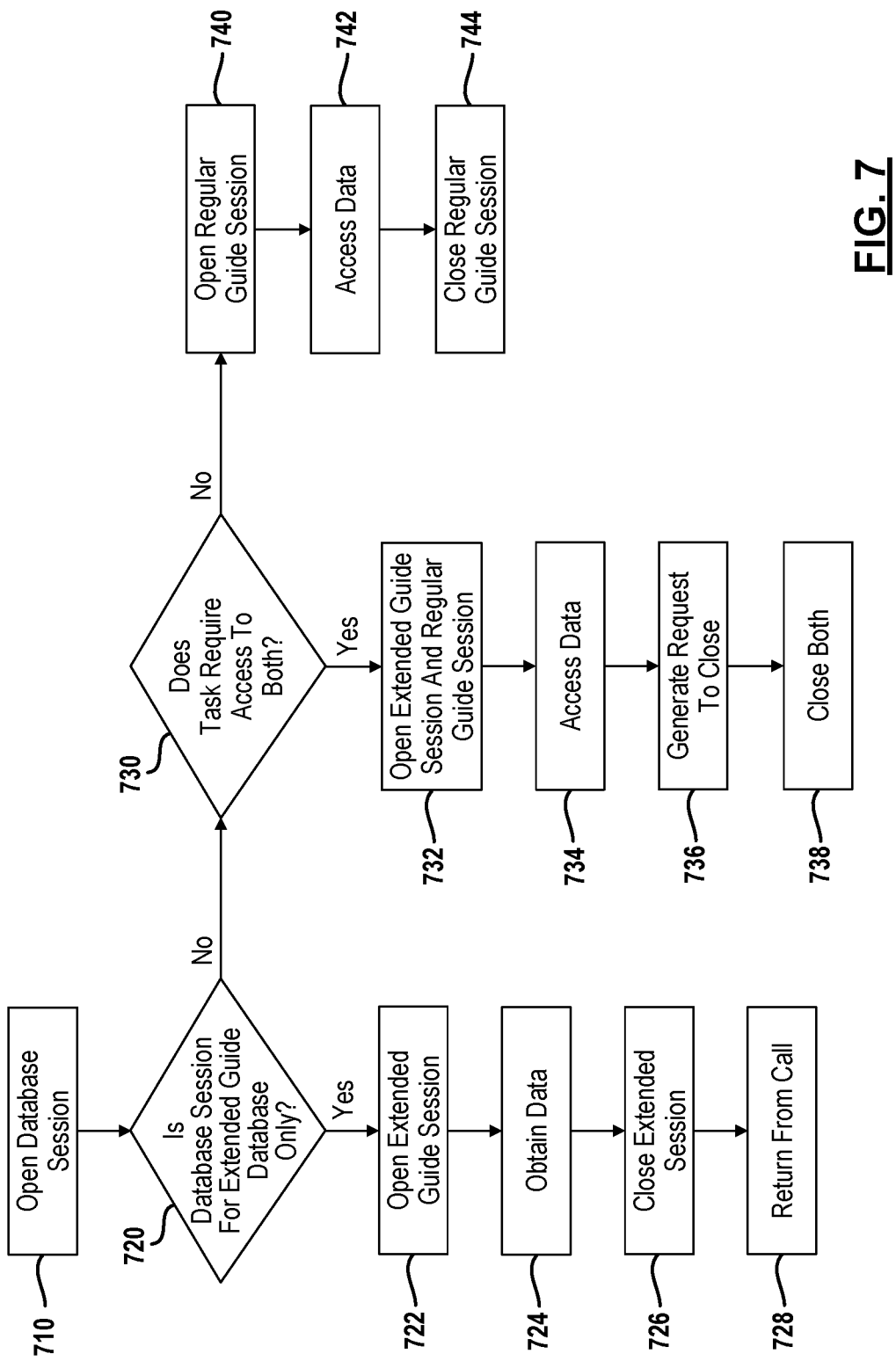
FIG. 7 is a flowchart of a method for opening and closing database sessions.

Referring now to FIG. 7, a method for controlling the interface 490 is set forth. In step 710, a database session is open. A database session is open when the user, through the user interface, desires various types of data to be displayed on the screen display. In step 620, the commands generated are used to determine if the database session is for an extended database. If the data requested is only for an extended guide database, step 722 opens an extended guide session. Thereafter, data is obtained in step 724 from the second database. In step 726, the extended session is immediately closed and the database is returned from the call in step 728. By accessing the extended database and immediately closing the extended database session after accessing, older models of user devices may be retrofitted. Current user devices may also use the same method for accessing. A separate database session is opened to obtain the extended guide database within the interface. In step 720, when the task requires not only the extended guide, step 730 is performed. If the task requires both databases, step 732 opens the extended guide session and the regular guide session simultaneously. Data is accessed from the two databases but is accessed separately. The data is returned in step 734. If a request to close both database sessions is performed in step 736, step 738 closes both database sessions.

Referring back to step 730, when the task does not require both databases to be opened in step 730, step 740 opens a regular database guide session. In step 742 data is accessed in the first database in return to the screen display. In step 744, the regular guide session is closed.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
providing, at a database interface of a first device, a first data object having a first type of data associated therewith;
providing, at the database interface of the first device, a second data object having a second type of data associated therewith, said second type different than the first type of data;
storing the first data object in a first database within the first device through control of the database interface, said first database storing the first type of data and not the second type of data;
storing the second data object in a second database that is accessible separately from and simultaneously with the first database of the first device through control of the database interface, said second database storing the second type and not the first type;
generating a first user input command from a first user device;
communicating the first user input command to the database interface;
generating a second user input command from a second user device different than the first user device;
communicating the second user input command to the database interface;
separately and simultaneously accessing the first database and the second database from the database interface based on the first user input command and the second user input command and separately and simultaneously communicating stored data to the first user device and the second user device through the database interface; and
displaying stored data through the first user device and second user device in response to accessing.

2. A method as recited in claim 1 wherein providing a first data object comprises providing a first program guide object.

3. A method as recited in claim 1 wherein providing a second data object comprises providing a second program guide object.

4. A method as recited in claim 1 wherein receiving a first program guide data object comprises receiving a program object, a schedule object and a channel object.

5. A method as recited in claim 4 wherein the program object, schedule object and channel object comprise grid guide data.

6. A method as recited in claim 5 wherein receiving a second program guide data object comprises an extended data object comprising data about content different than the grid guide data.

7. A method as recited in claim 6 wherein the extended data object comprises an extended program object and at least one of a biological information object, a graphics object and a parental guidance object.

8. A method as recited in claim 6 wherein the extended data object comprises an extended program object and a biographical information object.

9. A method as recited in claim 1 wherein receiving a first data object comprises receiving a first program guide data object through a first network and wherein receiving a second data object comprises receiving a second program guide data object through a second network different than the first network.

10. A method as recited in claim 9 wherein receiving a first program guide data object comprises receiving the first program guide data object through a satellite and wherein receiving a second program guide data object comprise receiving the second program guide data object through a terrestrial network.

11. A system comprising:
a first user device;
a second user device;
a first device comprising;
   a controller;
   a database interface;
   a memory coupled to the controller comprising a first database coupled to the database interface storing a first data object of a first type of data associated therewith under control of the database interface, said first data object forming a first portion of a display and a second database coupled to the database interface storing a second data object of a second type of data associated therewith different than the first type of data under control of the database interface, said second database accessible separately from and simultaneously with the first database through the database interface, said second data object forming a second portion of a display;
   a user interface module coupled to the controller receiving a first user input command from the first user device and a second user input command from the second user device;
   said controller comprising the database interface in electronic communication with the user interface module selecting a selected database from the first database, the second database or both and separately and simultaneously accessing the first database and the second database based on the first user input command and the second user input command to obtain stored data and separately and simultaneously communicating stored data to the first user device and to the second user device through the database interface;
   a first display associated with the first user device displaying the stored data; and
   a second display associated with the second user device displaying the stored data.

12. A user device as recited in claim 11 wherein the first data object comprises a first program guide object.

13. A user device as recited in claim 12 wherein the first program guide object comprises at least one of a program object, a schedule object and a channel object.

14. A user device as recited in claim 11 wherein the second data object comprises a second program guide object.

15. A user device as recited in claim 14 wherein the second program guide object comprises at least one of a program object, a schedule object and a channel object.

16. A user device as recited in claim 14 wherein the second data object comprises an extended data object comprising data about content different than grid guide data.

17. A user device as recited in claim 16 wherein the extended data object comprises an extended program object.

18. A user device as recited in claim 16 wherein the extended data object comprises an extended program object and at least one of a biological information object, a graphics object and a parental guidance object.

19. A user device as recited in claim 16 wherein the extended data object comprises an extended program object and a biographical information object.

20. A user device as recited in claim 11 wherein the first data object is received through a first network and the second data object is received through a second network, said second network different than the first network.

* * * * *